United States Patent
Brown et al.

(10) Patent No.: US 11,027,457 B2
(45) Date of Patent: Jun. 8, 2021

(54) METHOD AND APPARATUS FOR IMPROVING MIXING OF CEMENT SLURRY

(71) Applicant: Halliburton Energy Services, Inc., Houston, TX (US)

(72) Inventors: Paul Alan Brown, Duncan, OK (US); Paul Orman Padgett, Vernall, UT (US); Craig Allen Sneed, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 690 days.

(21) Appl. No.: 15/038,297

(22) PCT Filed: Dec. 20, 2013

(86) PCT No.: PCT/US2013/076821
§ 371 (c)(1),
(2) Date: May 20, 2016

(87) PCT Pub. No.: WO2015/094323
PCT Pub. Date: Jun. 25, 2015

(65) Prior Publication Data
US 2016/0288369 A1 Oct. 6, 2016

(51) Int. Cl.
| | |
|---|---|
| *B28C 5/06* | (2006.01) |
| *B01F 3/14* | (2006.01) |
| *B01F 15/00* | (2006.01) |
| *B01F 5/10* | (2006.01) |
| *B01F 15/04* | (2006.01) |
| *G05D 11/13* | (2006.01) |
| *E21B 47/005* | (2012.01) |

(Continued)

(52) U.S. Cl.
CPC ............. *B28C 5/06* (2013.01); *B01F 3/14* (2013.01); *B01F 5/106* (2013.01); *B01F 15/00207* (2013.01); *B01F 15/00376* (2013.01); *B01F 15/0408* (2013.01); *B28C 7/024* (2013.01); *E21B 47/005* (2020.05); *G05D 11/135* (2013.01); *B01F 2003/1285* (2013.01); *B01F 2215/0047* (2013.01)

(58) Field of Classification Search
CPC ..... E21B 47/0005; G05D 11/135; B28C 5/06; B28C 7/024
USPC ........................................................ 366/3
See application file for complete search history.

(56) References Cited

U.S. PATENT DOCUMENTS

| | | | |
|---|---|---|---|
| 2,668,437 A | * | 2/1954 | Patch ..................... G01N 7/00 73/1.61 |
| 4,764,019 A | | 8/1988 | Kaminski et al. |

(Continued)

OTHER PUBLICATIONS

International Search Report and Written Opinion issued in related PCT Application No. PCT/US2013/076821 dated Sep. 18, 2014, 12 pages.

(Continued)

*Primary Examiner* — Elizabeth Insler
(74) *Attorney, Agent, or Firm* — John W. Wustenberg; Baker Botts L.L.P.

(57) ABSTRACT

A method and apparatus are disclosed for a mixing system with a recirculation pump and a sensor configured to measure a property of a fluid discharged from the recirculation pump, wherein the sensor may transmit the property to a control system to allow an operator to adjust the mixing system in response to changes in the measurement signal.

10 Claims, 3 Drawing Sheets

(51) Int. Cl.
*B28C 7/02* (2006.01)
*B01F 3/12* (2006.01)

(56) References Cited

U.S. PATENT DOCUMENTS

| | | | |
|---|---|---|---|
| 5,046,855 A | | 9/1991 | Allen et al. |
| 5,114,239 A | | 5/1992 | Allen |
| 5,355,951 A | * | 10/1994 | Allen .................... E21B 33/14 |
| | | | 166/250.14 |
| 8,550,690 B2 | * | 10/2013 | Hines .................. B01F 13/1055 |
| | | | 366/138 |
| 2003/0072208 A1 | | 4/2003 | Rondeau et al. |
| 2005/0201197 A1 | | 9/2005 | Duell et al. |
| 2008/0053220 A1 | | 3/2008 | Allen |
| 2013/0145967 A1 | | 6/2013 | Koehler et al. |

OTHER PUBLICATIONS

Extended Search Report issued in related EP Application No. 13899389.4, dated May 29, 2017 (8 pages).
International Preliminary Report on Patentability issued in related Application No. PCT/US2013/076821, dated Jun. 30, 2016 (9 pages).
Search Report issued in related EP Application No. 13899389.4, dated Nov. 27, 2018 (6 pages).

* cited by examiner

METHOD AND APPARATUS FOR IMPROVING MIXING OF CEMENT SLURRY

CROSS-REFERENCE TO RELATED APPLICATION

The present application is a U.S. National Stage Application of International Application No. PCT/US2013/076821 filed Dec. 20, 2013, which is incorporated herein by reference in its entirety for all purposes.

BACKGROUND

The present disclosure relates to methods and apparatus for mixing substances. More particularly, the present disclosure relates to methods and apparatus for mixing cement slurry for use in an oil or gas well.

To prepare cement slurry for use in a downhole cementing operation, a dry bulk powder cement is typically mixed with a quantity of water. In addition, one or more additives may be added to the mixture. The properties of the resulting cement slurry for use in the wellbore are typically controlled and adjusted depending on the formation characteristics and other requirements of the particular operation. Among these properties, controlling the density of the resulting cement placed in the wellbore is often one of the important goals of a successful cementing operation.

However, during a mixing operation, the performance of the mixing and recirculation system may deteriorate. For example, variations in the rate of dry bulk powder delivery, the volume of conveying air, and/or inadequate mixing of the dry bulk powder may cause the recirculation pump to cavitate.

Mixing and recirculation issues may result in cement slurry exhibiting undesired characteristics. For example, the mixed cement slurry may contain "fish eyes,"unmixed clumps of dry blend in the cement that may weaken the cement integrity. A cement slurry with inconsistent and/or uneven properties may also result from an inefficient mixing performance. Thus, improvement of the ability to control and reduce the impact of any mixing or recirculation issues encountered during the mixing of the cement slurry may give an operator greater control over the characteristics and quality of the resulting cement for use in the wellbore.

BRIEF DESCRIPTION OF THE DRAWINGS

These drawings illustrate certain aspects of some of the embodiments of the present disclosure, and should not be used to limit or define the disclosure.

While embodiments of this disclosure have been depicted and described and are defined by reference to example embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure relates to methods and apparatus for mixing substances. More particularly, the present disclosure relates to methods and apparatus for mixing cement slurry for use in an oil or gas well.

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

Figure 1:
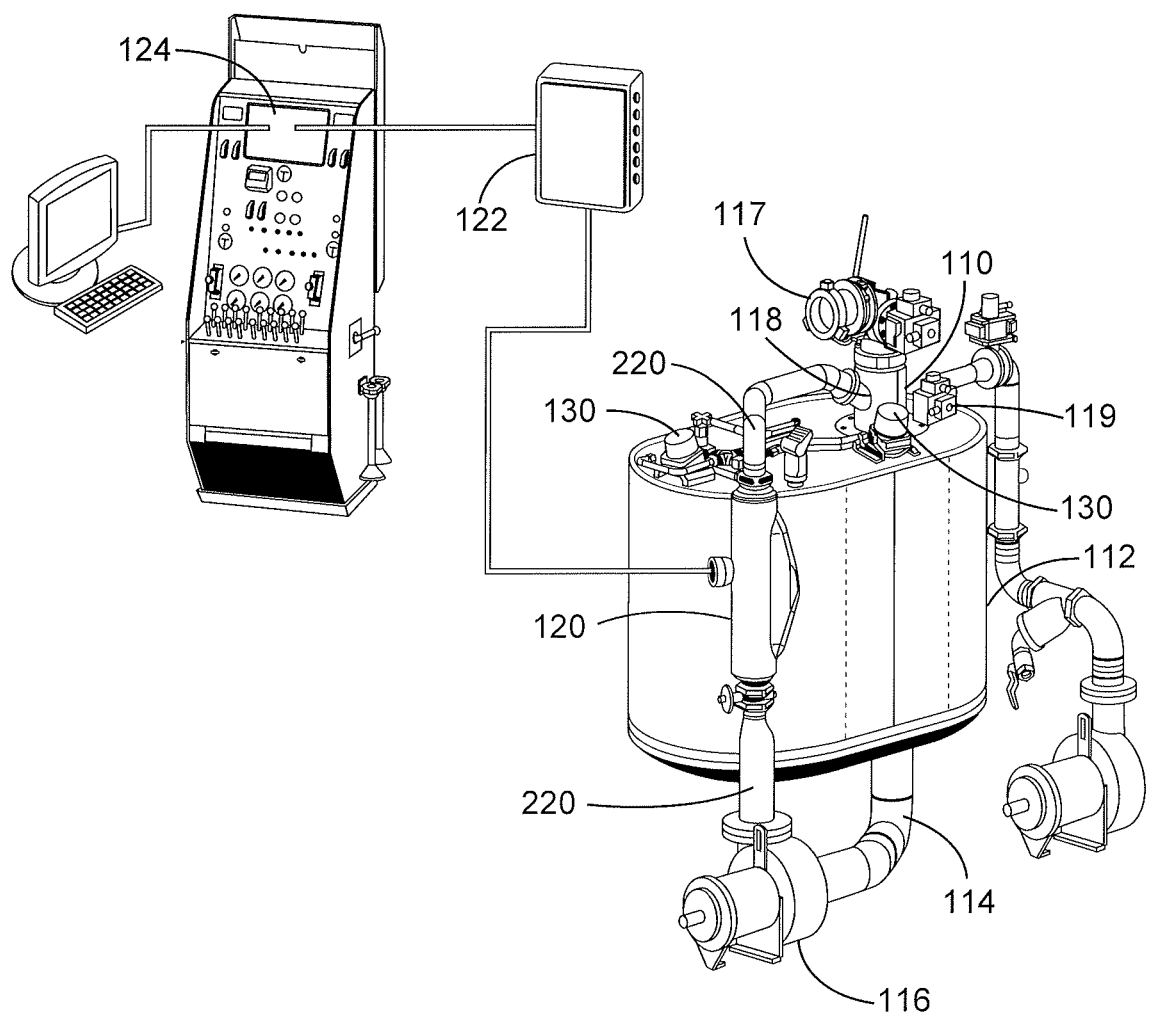
FIG. 1 illustrates an example mixing system, incorporating aspects of the present disclosure.

Referring to FIG. 1, an example mixing system 100 is shown, incorporating aspects of the present disclosure. The mixing system may comprise a recirculation cement mixer (RCM) 110, a recirculation tub 112, a recirculation manifold 114, and a recirculation pump 116. The RCM 110 may have a recirculation fluid inlet 118, a water inlet 119, and a bulk powder inlet 117. The RCM 110 may be fluidly connected to the recirculation tub 112. The recirculation tub 112 may be fluidly connected to the recirculation manifold 114 at a first end of the recirculation manifold 114. In certain embodiments, the recirculation manifold 114 may be connected to the recirculation tub 112 on a substantially opposite end of the recirculation tub 112 from the RCM 110. In certain embodiments, the recirculation manifold 114 may be in fluid communication with substantially the entire contents of the recirculation tub 112. In certain embodiments, the recirculation tub 112 may further comprise at least one agitator 130 to mix the cement slurry while in the recirculation tub 112.

The recirculation manifold 114 may be fluidly connected to the recirculation pump 116 at a second end of the recirculation manifold 114 to direct fluid from the recirculation tub 112 towards the recirculation pump 116. The recirculation pump 116 may be configured to direct fluid towards the RCM recirculation fluid inlet 118 via a recirculation discharge manifold 220. The recirculation discharge manifold 220 may be fluidly connected to the recirculation pump 116 at a first end of the recirculation discharge manifold 220 and may be fluidly connected to the recirculation fluid inlet 118 at a second end of the recirculation discharge manifold 220. As such, the recirculation pump 116 may direct fluid from the recirculation tub 112, provided through the recirculation manifold 114 to the recirculation pump 116 through the recirculation discharge manifold 220 to the recirculation fluid inlet 118. In certain embodiments, the recirculation pump 116 may be a 6 inch by 5 inch recirculation pump. For example, the recirculation pump 116 may be a Halliburton 6×5 Centrifugal pump. In certain embodiments, the mixing system 100 may comprise a pumping manifold 140 fluidly connected to the recirculation tub 112 to direct fluid towards a wellbore.

The mixing system 100 may tolerate a level of air entrainment of the cement slurry. When the cement slurry air entrainment percentage increases above the level tolerated by the mixing system 100, the mixing system performance may deteriorate. For example, an increased air entrainment of the cement slurry may decrease the performance of the recirculation pump 116. The deterioration of the mixing system may cause a negative feedback loop. For example, an initial decrease in performance of the recirculation pump 116 may cause cavitation and/or poor mixing of the cement slurry, which, in turn, may create an increased air entrainment of the cement slurry, which may further deteriorate the performance of the recirculation pump 116.

Monitoring the air entrainment percentage of the cement slurry during mixing and recirculation may provide an indication that the mixing system performance may soon deteriorate and/or has currently deteriorated. Indeed, monitoring the air entrainment percentage of the cement slurry may allow an operator to be alerted to potential problems and diagnose the cause, possibly before the problem makes a material impact on the mixing operation. In addition, the cement slurry discharge pressure from the recirculation pump 116 of the mixing system 100 may be monitored, either in addition to air entrainment measurements or in place of air entrainment measurements. The change in discharge pressure may be used to confirm a mixing performance problem. When the discharge pressure of the recirculation pump 116 is out of a normal range and fluctuates erratically, the recirculation pump 116 may be operating at below optimal conditions. Alerting the operator to the change in discharge pressure may allow the operator to identify the mixing problem and take steps to address the problem.

A sensor 120 may be placed in the recirculation discharge manifold 220. In certain embodiments, the sensor 120 may be placed on the recirculation discharge manifold 220, between the recirculation pump 116 and the RCM recirculation fluid inlet 118. The sensor 120 may be configured to measure a desired property of the cement slurry located in the recirculation discharge manifold 220, during the mixing and recirculation process, such as, for example, air entrainment and/or pressure. In certain embodiments, the sensor 120 may measure the desired property of the cement slurry substantially in real-time. In certain embodiments, for example, the sensor 120 may read a measurement of the cement slurry in intervals of about 0.1 seconds to about 10 seconds. For example, the sensor 120 may read a measurement of the cement slurry in intervals of about 1 second. In certain embodiments, the sensor 120 may be connected to a control system 122 to allow a measurement data signal to be sent from the sensor 120 to the control system 122. In certain embodiments, the sensor 120 may send the measurement data signal substantially in real-time. In certain embodiments, the sensor 120 may send the signal containing measurement data at predetermined intervals. In certain embodiments, for example, the sensor 120 may send the most recent measurement to the control system 122 in intervals of about 0.1 seconds to about 10 seconds. For example, the sensor 120 may send the most recent measurement to the control system 122 in intervals of about 1 second. In certain embodiments, the sensor 120 may send the signal containing measurement data when the measured property has a value outside a predetermined range. The control system 122 may output sensor data to a display screen 124. In certain embodiments, the sensor 120 may store recent measurement data. In certain embodiments, the sensor 120 may send measurement data to the control system 122 in batches.

Figure 2:
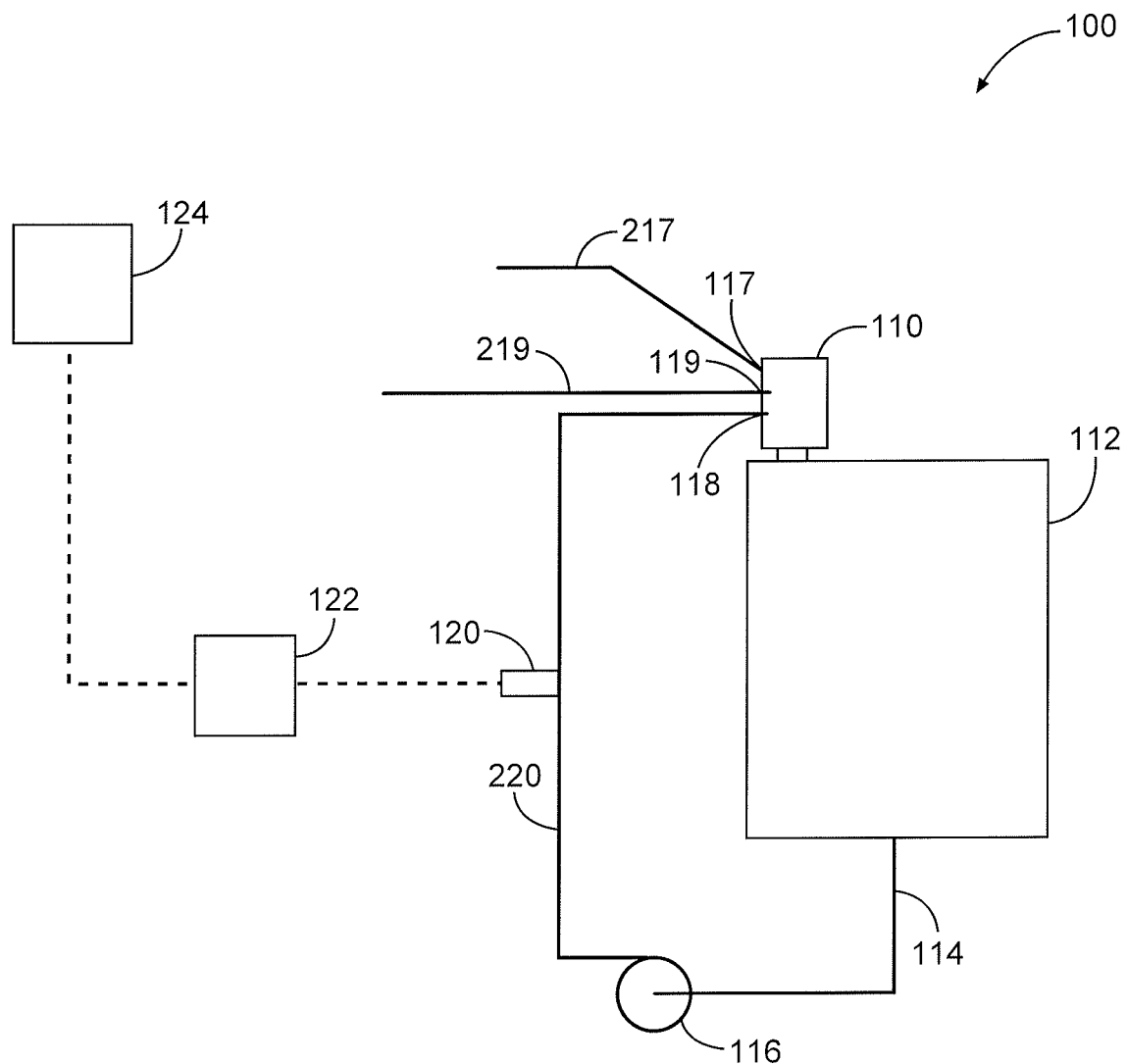
FIG. 2 shows a schematic drawing of an example mixing system, incorporating aspects of the present disclosure.

Referring to FIG. 2, a schematic drawing of an example mixing system 100 is shown. During mixing, dry bulk powder may be pneumatically conveyed from the bulk powder source 217 into the RCM 110 through the bulk powder inlet 117 and mixed with water from a water source 219 connected to the RCM 110 at the water inlet 119 to create a cement slurry. The cement slurry may be discharged into the recirculation tub 112. In certain embodiments, the recirculation tub 112 may further comprise at least one agitator (not shown) to mix the cement slurry while in the recirculation tub 112. The cement slurry may then enter the recirculation manifold 114, where the recirculation pump 116 may direct the cement slurry through the recirculation discharge manifold 220 to the RCM 110 via the recirculation fluid inlet 118. In certain embodiments, the cement slurry recirculated to the RCM 110 may be mixed with additional dry bulk powder and/or water. In certain embodiments, the cement slurry recirculated to the RCM 110 may be discharged to the recirculation tub 112 without any additional dry bulk powder or water being added.

As the cement slurry is recirculated through the recirculation discharge manifold 114, the sensor 120 may measure a desired property of the cement slurry and send a measurement signal to the control system 122. Communication between the sensor 120 and the control system 122 may be achieved wirelessly or through wires. In addition, the sensor 120 and the control system 122 may communicate directly or indirectly through intermediary devices. The control system 122 may be a PLC, CPU, or any other control system. The control system 122 may display the measured reading on the display screen 124. The control system 122 may include a database configured to store the measurement data sent by the sensor 120. An operator may use the measured reading to diagnose a mixing problem and/or determine whether to adjust one or more parameters of the cement mixing operation.

In certain embodiments, the sensor 120 may be an air entrainment sensor. In certain embodiments, the air entrainment sensor may be a CiDRA Air Entrainment sensor. The air entrainment sensor may measure the percent of air entrained in the cement slurry. Upon measuring the air entrainment, the air entrainment sensor may send an air entrainment measurement signal to the control system 122.

Under normal mixing conditions, the recirculated cement slurry may have a low and steady air entrainment percentage. In certain embodiments, the air entrainment percentage reading may be under about 4% under normal mixing conditions. In certain embodiments, an air entrainment percentage from about 4% to about 6% may indicate a mixing problem. For example, if the air entrainment percentage rises above a tolerable level the performance of the recirculation pump 116 may deteriorate, which may detrimentally affect the mixing and recirculation performance of the mixing system 100. In certain embodiments, an erratic air entrainment change may indicate a mixing problem. In certain embodiments, an air entrainment change of about 2% to about 3% may be erratic. In response to a change in the air entrainment percentage, the operator may make one or more adjustments to the mixing operation, including, but not limited to, adding a defoaming chemical to remove air from the cement slurry, slow the mixing rate to steady the bulk rate flow, and/or change the agitation speed. In certain embodiments, the defoaming chemical may be D-Air 4000L™ Defoamer, available from Halliburton, Houston, Texas. The availability of adjustments made to the mixing system by the operator in response to a mixing problem is known to one of ordinary skill in the art and the particular adjustment made may depend on the cause of the air entrainment increase. In certain embodiments, air entrainment above 6% may cause substantially complete cavitation of the recirculation pump.

In addition, providing the operator with the air entrainment percentage measurements may allow greater control of the cement slurry downhole density. The air entrainment measurement for recirculated cement slurry may provide improved warning of pending mixing problems to the operator, which may allow the operator to make one or more adjustments to avoid the mixing problem entirely. As a result, the operator may obtain higher quality cement slurry with greater uniformity. In addition, the air entrainment of the cement slurry may be taken into account when calculating the resulting downhole density of the cement slurry. For example, if the cement slurry has a higher air entrainment, the resulting downhole density may be lower than expected due to the increased air inclusion.

In certain embodiments, the sensor 120 may be a pressure sensor. The pressure sensor may measure the discharge pressure of the recirculation discharge manifold 114 and send the pressure reading to the control system 122.

Under normal mixing conditions, the cement slurry may have a steady pressure reading in a normal range, according to the density and quality of the cement slurry. In certain embodiments, the pressure reading normal range may be about 25 psi to about 50 psi. The pressure reading may become erratic if too much air becomes entrained in the cement slurry. In certain embodiments, a pressure of the cement slurry out of the normal pressure range may indicate a mixing problem. In certain embodiments, an erratic pressure reading varying over about 5 psi within about 5 seconds may indicate a mixing problem. In response to a change in the air entrainment percentage, the operator may make a number of adjustments to the mixing operation, including, but not limited to, adding the defoaming chemical to eject air from the cement slurry; slow the mixing rate to steady the bulk rate flow; adjusting the bulk cement and/or mixing water addition rate; and/or change the agitation speed. The operator response will be known to one of ordinary skill in the art with the benefit of this disclosure and may depend on the cause of the air entrainment increase.

Figure 3:
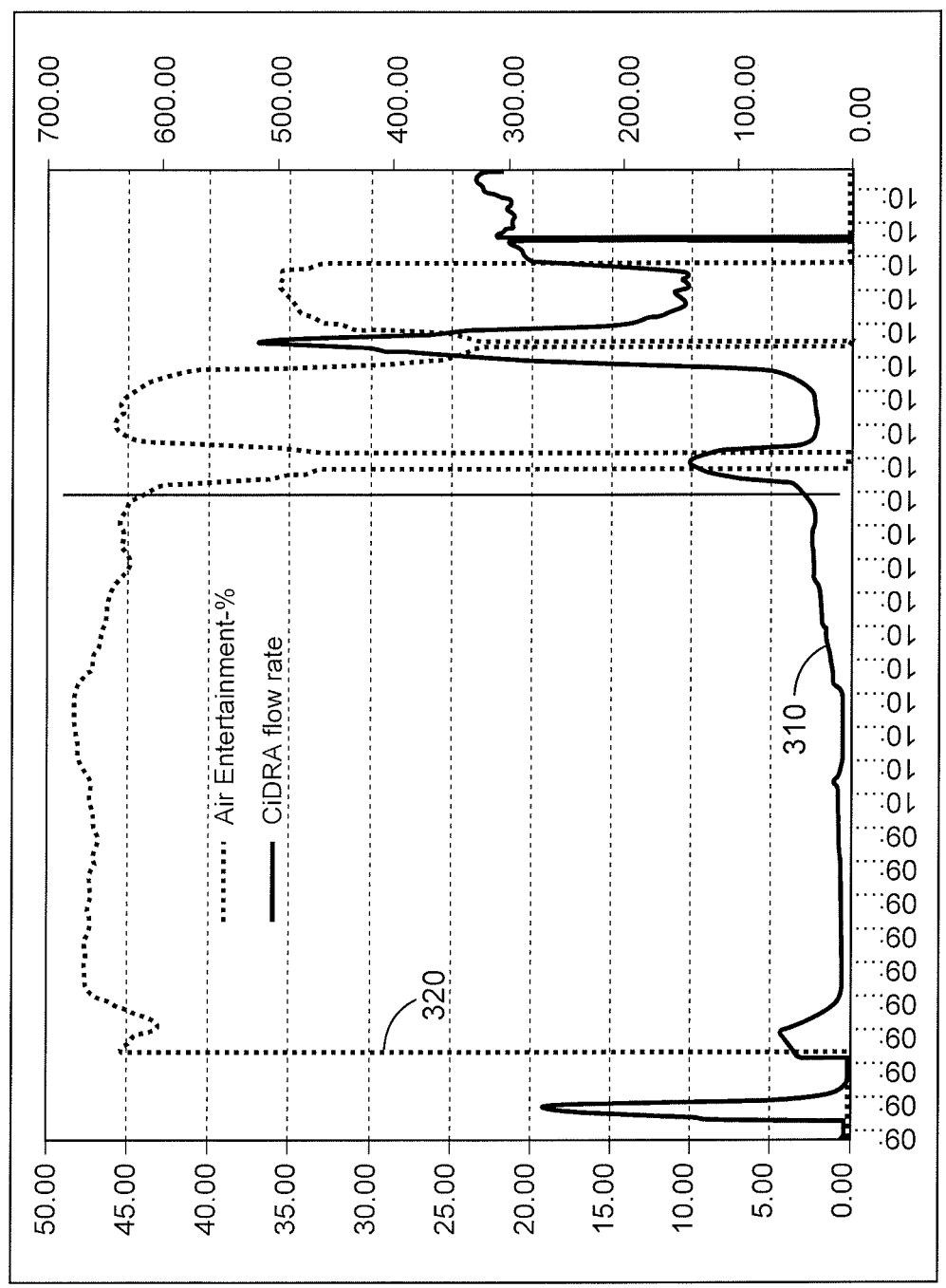
FIG. 3 is a graph showing the change in mixing and recirculation parameters during the course of an example mixing operation, incorporating aspects of the present disclosure.

FIG. 3 is a graph showing the relationship between air entrainment of the recirculated cement slurry and recirculation pump efficiency is shown for an example mixing operation, according to the present disclosure. Examples are provided for explanatory purposes and are not intended to be limiting. In the example mixing operation shown, the cement slurry recirculation flow rate 320 remained at a normal range and steady while the air entrainment percentage 310 remained below about 4%. In the example mixing operation shown, the flow rate equal to or greater than about 500 gpm may be considered in a normal range. At about time 10:08, the density of the cement slurry is increased and the air entrainment percentage 310 increases to beyond 4% at about time 10:09:27 and continues to increase. As a result, at about time 10:10:11, the recirculation flow rate 320 drops considerably as mixing becomes much more difficult. At about time 10:11:39, an adjustment to decrease the entrained air percentage was made and, as a result, the recirculation flow rate 320 increases again to a normal operating level as the recirculation pump returns to normal operating efficiency. As such, entrained air percentage may provide an indication of present or pending cement slurry mixing problems.

In certain embodiments, a method may comprise providing a mixing system, comprising: a recirculation tub; a recirculation cement mixer fluidly connected to the recirculation tub, wherein the recirculation cement mixer has a recirculation fluid inlet, a water inlet, and a cement powder inlet; a recirculation pump fluidly connected to the recirculation tub via a recirculation manifold, wherein the recirculation manifold directs fluid towards the recirculation pump; a recirculation discharge manifold in fluid communication with the recirculation pump and the recirculation fluid inlet, wherein the recirculation pump directs fluid toward the recirculation inlet via the recirculation discharge manifold; and a sensor attached to the recirculation discharge manifold, wherein the sensor is configured to measure a property of a fluid in the recirculation discharge manifold; and recirculating the fluid from the recirculation tub to the recirculation fluid inlet through the recirculation pump; measuring the property of the fluid in the recirculation discharge manifold; transmitting from the sensor a measurement signal to a control system; and adjusting the mixing system in response to the measurement signal.

In certain embodiments, a method may comprise providing a mixing system, comprising: a recirculation tub; a recirculation cement mixer fluidly connected to the recirculation tub, wherein the recirculation cement mixer has a recirculation fluid inlet, a water inlet, and a cement powder inlet; a recirculation pump fluidly connected to the recirculation tub via a recirculation manifold, wherein the recirculation manifold directs fluid towards the recirculation pump; a recirculation discharge manifold in fluid communication with the recirculation pump and the recirculation fluid inlet, wherein the recirculation pump directs fluid toward the recirculation inlet via the recirculation discharge manifold; and a sensor attached to the recirculation discharge manifold, wherein the sensor is configured to measure a property of a fluid in the recirculation discharge manifold; and recirculating the fluid from the recirculation tub to the recirculation fluid inlet through the recirculation pump; measuring the property of the fluid in the recirculation discharge manifold; transmitting a mixing problem indication signal from the sensor to a control system; and adjusting the mixing system in response to the mixing problem indication signal.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are defined herein to mean one or more than one of the element that it introduces.

What is claimed is:

1. A method, comprising:
   providing a mixing system, comprising:
   a recirculation tub comprising at least one agitator;
   a recirculation cement mixer fluidly connected to the recirculation tub, wherein the recirculation cement mixer has a recirculation fluid inlet, a water inlet, and a cement powder inlet;
   a recirculation pump fluidly connected to the recirculation tub via a recirculation manifold, wherein the recirculation manifold directs fluid towards the recirculation pump;

a recirculation discharge manifold in fluid communication with the recirculation pump at a first end of the recirculation discharge manifold and the recirculation fluid inlet at a second end of the recirculation discharge manifold, wherein the recirculation pump directs fluid toward the recirculation inlet via the recirculation discharge manifold; and a sensor attached to the recirculation discharge manifold, wherein the sensor comprises an air entrainment sensor and is configured to measure a property of a fluid in the recirculation discharge manifold, wherein the property of the fluid being measured comprises an air entrainment measurement;

recirculating the fluid from the recirculation tub through the recirculation pump to the recirculation cement mixer via the recirculation fluid inlet;

measuring the property of the fluid in the recirculation discharge manifold with the sensor;

transmitting signal representing the property being measured from the sensor to a control system; and adjusting the mixing system in response to the measurement signal, wherein the mixing system is adjusted in response to the measurement signal indicating that the air entrainment of the fluid is above about 6% of a volume of the fluid.

2. The method of claim 1, wherein adjusting the mixing system in response to the measurement signal comprises removing air from the fluid.

3. The method of claim 1, wherein the recirculation pump is a centrifugal pump.

4. The method of claim 1, wherein adjusting the mixing system in response to the measurement signal comprises adjusting the fluid agitation speed.

5. The method of claim 1, wherein the sensor comprises a pressure sensor, and wherein the property of the fluid comprises a pressure measurement.

6. The method of claim 5, wherein the mixing system is adjusted in response to the measurement signal indicating that the pressure measurement is outside the range of about 25 psi to about 50 psi.

7. The method of claim 5, wherein adjusting the mixing system in response to the measurement signal comprises removing air from the fluid.

8. The method of claim 5, wherein the recirculation pump is a centrifugal pump.

9. The method of claim 5, wherein adjusting the mixing system in response to the measurement signal comprises adjusting the fluid agitation speed.

10. The method of claim 1, wherein the fluid is a cement slurry.

* * * * *